United States Patent
Leone et al.

(10) Patent No.: US 11,156,149 B1
(45) Date of Patent: Oct. 26, 2021

(54) SYSTEMS AND METHODS FOR A VARIABLE VOLUME PRE-CHAMBER IGNITER

(71) Applicant: Ford Global Technologies, LLC, Dearborn, MI (US)

(72) Inventors: Thomas Leone, Ypsilanti, MI (US); Michael Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/018,481

(22) Filed: Sep. 11, 2020

(51) Int. Cl.
*F02B 19/16* (2006.01)
*F02B 19/12* (2006.01)
*F02P 13/00* (2006.01)

(52) U.S. Cl.
CPC .............. *F02B 19/16* (2013.01); *F02B 19/12* (2013.01); *F02P 13/00* (2013.01)

(58) Field of Classification Search
CPC ............ F02B 19/16; F02B 19/12; F02P 13/00
See application file for complete search history.

(56) References Cited

U.S. PATENT DOCUMENTS

| | | | | |
|---|---|---|---|---|
| 3,911,878 A | * | 10/1975 | Hofbauer | F02G 1/02 123/80 R |
| 4,342,300 A | * | 8/1982 | Matthes | F02B 19/02 123/250 |
| 4,372,264 A | * | 2/1983 | Trucco | F02B 19/02 123/255 |
| 4,424,780 A | * | 1/1984 | Trucco | F02B 19/02 123/255 |
| 4,890,585 A | * | 1/1990 | Hathorn | F02B 75/04 123/48 A |
| 4,987,863 A | * | 1/1991 | Daly | F02D 15/04 123/48 AA |
| 5,463,267 A | | 10/1995 | Conway | |
| 5,826,558 A | * | 10/1998 | Kawamura | F02B 19/02 123/292 |

(Continued)

FOREIGN PATENT DOCUMENTS

| | | |
|---|---|---|
| DE | 102006037412 A1 | 2/2008 |
| DE | 102017222814 A1 | 6/2019 |
| KR | 20030000002 A | 1/2003 |

OTHER PUBLICATIONS

Leone, T. et al., "Methods and Systems for a Series Gap Igniter With a Passive Pre-Chamber," U.S. Appl. No. 16/796,160, filed Feb. 20, 2020, 68 pages.

(Continued)

*Primary Examiner* — Xiao En Mo
(74) *Attorney, Agent, or Firm* — Geoffrey Brumbaugh; McCoy Russell LLP

(57) ABSTRACT

Systems and methods are provided for a variable volume pre-chamber igniter, which may be coupled in an engine system. In one example, a system may include a pre-chamber igniter coupled to a cylinder of an engine, the pre-chamber igniter including a movable cap enclosing an internal volume of the pre-chamber igniter and separating the internal volume of the pre-chamber igniter from an internal volume of the cylinder. By adjusting a position of the cap, the internal volume of the pre-chamber igniter may be adjusted to provide reliable ignition to the cylinder across a wide range of operating conditions.

20 Claims, 9 Drawing Sheets

(56) References Cited

U.S. PATENT DOCUMENTS

| | | | |
|---|---|---|---|
| 6,941,907 B2* | 9/2005 | Dixon | F02B 19/02 |
| | | | 123/78 D |
| 7,513,234 B1 | 4/2009 | Baldwin et al. | |
| 8,925,518 B1 | 1/2015 | Riley et al. | |
| 10,087,817 B2* | 10/2018 | Kreuter | F02B 19/06 |
| 2006/0219210 A1* | 10/2006 | Bailey | F02B 19/12 |
| | | | 123/259 |
| 2019/0353088 A1* | 11/2019 | Ketterer | F02B 19/1014 |

OTHER PUBLICATIONS

Leone, T. et al., "Methods and Systems for a Series Gap Igniter With a Passive Pre-Chamber," U.S. Appl. No. 16/920,861, filed Jul. 6, 2020, 66 pages.

\* cited by examiner

SYSTEMS AND METHODS FOR A VARIABLE VOLUME PRE-CHAMBER IGNITER

FIELD

The present description relates generally to systems and methods for engines having pre-chamber ignition systems.

BACKGROUND/SUMMARY

An internal combustion engine combusts an air-fuel mixture within cylinders to produce torque, which may be used to propel a vehicle. In some such engines, an ignition source is used to ignite the air-fuel mixture within each cylinder during a compression stroke. For example, in traditional spark-ignition engines, each cylinder includes a spark plug for directly igniting the air-fuel mixture within the cylinder. In other examples, the air-fuel mixture within the cylinder may be ignited by jets of hot gas and flame from a pre-combustion chamber, referred to herein as a pre-chamber. A passive pre-chamber may be a walled chamber located in the clearance volume of the cylinder and may include a spark plug. During engine operation, an air-fuel mixture is introduced into the cylinder, and a fraction of the air-fuel mixture is inducted into the passive pre-chamber via a pressure differential between the passive pre-chamber and the cylinder during a compression stroke of the cylinder. When ignition is requested, the spark plug in the pre-chamber is actuated, igniting the fraction of the air-fuel mixture in the pre-chamber. After the fraction of the air-fuel mixture is ignited in the pre-chamber, jets of flame and hot gas may exit the pre-chamber and enter the cylinder via one or more holes in the pre-chamber walls. These jets ignite the air-fuel mixture in the cylinder to produce torque.

Pre-chamber ignition may offer performance and efficiency benefits over a traditional spark-ignition engine during some engine operating conditions. For example, a cylinder with pre-chamber ignition may operate with more dilution (e.g., higher exhaust gas recirculation or a leaner air-fuel ratio) than a similar cylinder of a traditional spark-ignition engine, which may lead to lower fuel consumption in the cylinder with pre-chamber ignition. In other examples, a cylinder with pre-chamber ignition may produce more power than a cylinder ignited by a spark plug due to an increased burn rate in the cylinder, which may reduce an amount of time for knocking combustion to occur and thereby allow ignition timing to be advanced further toward maximum brake torque (MBT).

However, passive pre-chamber systems do not offer direct control of fuel and oxygen levels in the pre-chamber. For example, during low load operation, the amount of the air-fuel mixture inducted into the passive pre-chamber may decrease, and low levels of fuel and oxygen in the passive pre-chamber may result in decreased combustion stability (e.g., ignitability) and an increased incidence of pre-chamber misfire. In another example, during a cold start condition, a low temperature in the passive pre-chamber may decrease the combustion stability of the pre-chamber.

Other attempts to increase the combustion stability of pre-chamber systems across a range of operating conditions include systems for directly injecting both fuel and air into the pre-chamber, referred to herein as an active pre-chamber system. One example approach is shown by Riley et al. in U.S. Pat. No. 8,925,518 Bi. Therein, an active pre-chamber system including direct fuel injection and direct oxygen injection in a pre-chamber is disclosed. By directly injecting fuel and oxygen into the pre-chamber, an AFR of the pre-chamber may be commanded independently of an AFR of the cylinder.

However, the inventors herein have recognized potential issues with such systems. As one example, in systems with an active pre-chamber, the addition of pre-chamber fuel injectors and pre-chamber air injectors may increase a cost and complexity of the system and may introduce significant packaging constraints. For example, a size of intake and exhaust valves, cooling passages, etc. may be reduced to enable packaging one or more injectors plus a spark plug with adequate dielectric insulation within the pre-chamber.

In one example, the issues described above may be addressed by a system, comprising: a pre-chamber igniter coupled to a cylinder of an engine, the pre-chamber igniter comprising a cap dividing an internal volume of the pre-chamber igniter from an internal volume of the cylinder, the cap movable between a first position and a second position. In this way, the cap may be adjusted between the first position and the second position to vary the internal volume of the pre-chamber in order to provide robust ignition to the cylinder across a range of operating conditions.

As one example, the internal volume of the pre-chamber igniter may be smaller when the cap is in the first position, which may be a retracted position, and larger when the cap is in the second position, which may be an extended position. For example, the cap may be extended further toward a piston of the cylinder in the second, extended position relative to the first, retracted position. The cap may comprise a capped cylindrical tube having one or more openings (e.g., orifices) that fluidically couple the internal volume of the pre-chamber igniter to the internal volume of the cylinder, for example. The pre-chamber igniter may include a spark gap within the internal volume of the pre-chamber igniter between an electrode tip and a ground electrode. In one example, the ground electrode may be coupled to a bottom inner surface of the cap, and the spark gap may be smaller when the cap is in the first position relative to the second position. Thus, in such examples, a length of the spark gap may also vary as the internal volume of the pre-chamber igniter varies with the position of the cap. In another example, the ground electrode may be coupled to a body of the pre-chamber igniter that surrounds an upper portion of the cap, and the ground electrode may extend from the body of the pre-chamber igniter into the internal volume of the pre-chamber igniter via a slot in the cap. In such examples, the spark gap may not vary with the position of the cap, but a distance between the bottom inner surface of the cap and the ground electrode may be smaller when the cap is in the first position relative to the second position. An actuator may adjust the cap between the first position and the second position responsive to operating conditions. For example, the actuator may be a solenoid, an electric motor, a pneumatic actuator, a vacuum actuator, or a hydraulic actuator that directly or indirectly (e.g., via a mechanical linkage or a cam) moves the cap.

By adjusting the cap to the first position, an ignition speed of the cylinder may be increased during higher load and higher temperature conditions, as the smaller internal volume results in a faster pressure build up and higher velocity jets of flame and hot jets exiting the one or more openings to the cylinder. As such, the cylinder may be operated with an ignition timing closer to MBT timing for increased power and fuel efficiency. By adjusting the cap to the second position, the combustion stability within the pre-chamber igniter may be increased during low load and low temperature conditions, as the larger internal volume reduces an occurrence of flame kernel quenching within the pre-chamber igniter. Additionally, when the ground electrode is directly coupled to the inner bottom surface of the cap, the larger spark gap provided when the cap is in the second position may create a larger and faster growing flame kernel. Overall, robust pre-chamber ignition is provided over a wider range of operating conditions relative to a fixed geometry pre-chamber, thereby increasing engine efficiency, while a cost and size of the pre-chamber igniter is lower relative to active pre-chambers that include an additional fuel injector inside the pre-chamber. As such, larger intake and exhaust valves may be used in the engine, resulting in a higher engine power capacity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
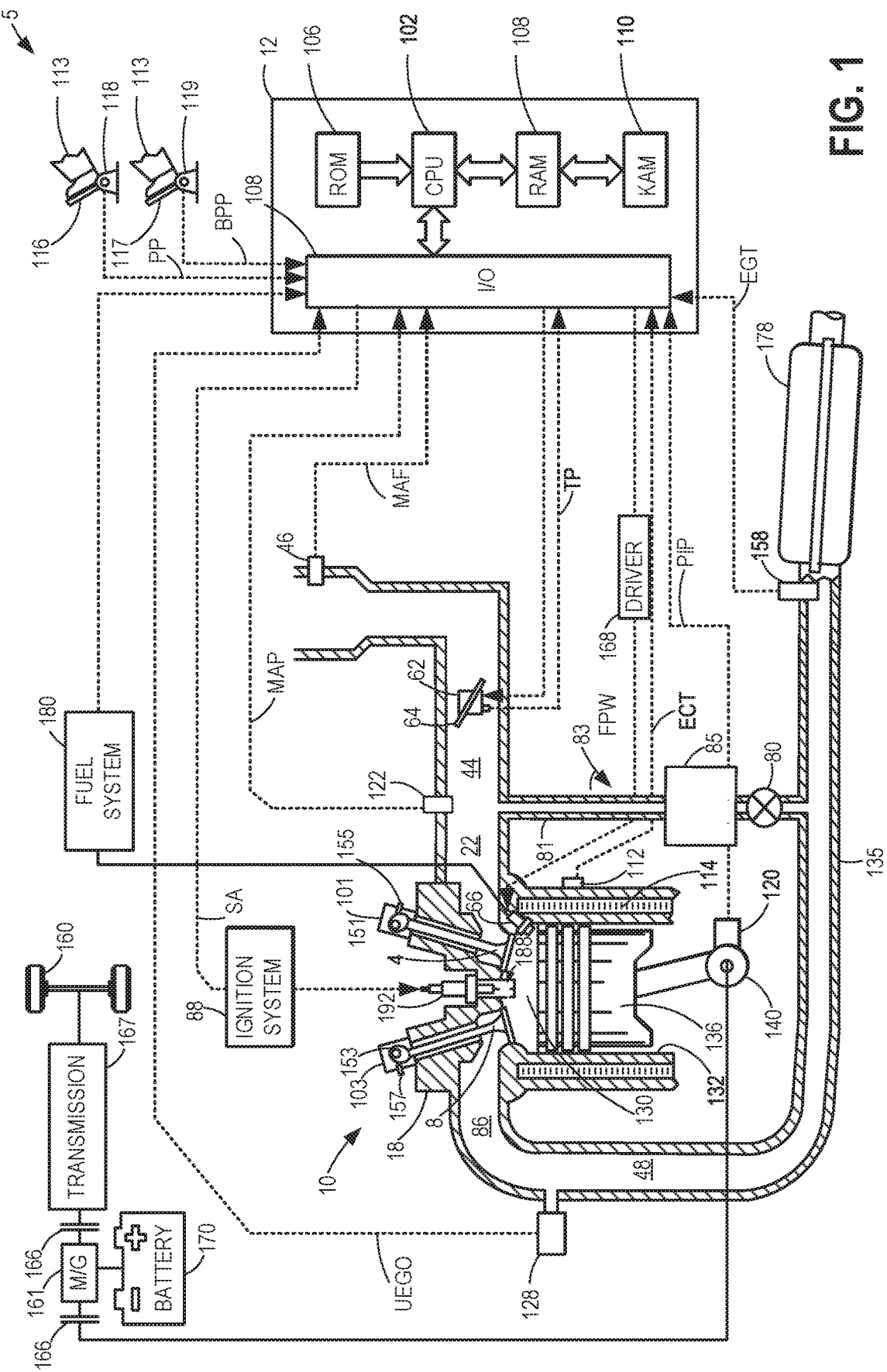
FIG. 1 shows a schematic depiction of a cylinder configuration in an engine system of a vehicle.

The following description relates to systems and methods for an engine having a pre-chamber ignition system. The engine may have a plurality of cylinders, each having a cylinder configuration including a pre-chamber, as shown in FIG. 1. The pre-chamber may further include an adjustable pre-chamber cap, which may be adjusted to at least two positions to vary a volume of the pre-chamber and, in some examples, a size of a spark gap within the pre-chamber, as shown in FIGS. 2A-3B. A spark plug of the pre-chamber may be electrically coupled to an ignition system according to the wiring diagram shown in FIG. 4. For example, a volume of the pre-chamber may be varied in order to provide robust ignition across a range of engine loads, as shown in FIG. 5. Further, a controller may adjust a position of the adjustable pre-chamber cap in order to increase ignitability in the pre-chamber based on engine operating conditions (e.g., engine load and engine temperature), such as according to the method of FIG. 6. A prophetic example timeline illustrating adjusting the position of the adjustable pre-chamber cap, and therefore the volume of the pre-chamber, based on the engine operating conditions to increase ignitability or increase cylinder efficiency is shown in FIG. 7.

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

In the depicted view, intake valve 4 and exhaust valve 8 are located at an upper region of combustion chamber 130, and may be coupled to a cylinder head 18. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valve and exhaust valve may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO, a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically actuated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through an EGR cooler 85 within EGR passage 81. EGR cooler 85 may reject heat from the EGR gases to engine coolant, for example.

Under some conditions, the EGR system may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load, engine speed, engine temperature, etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. The compression ratio may also be increased if pre-chamber ignition increases knock resistance due to faster combustion.

As a non-limiting example, cylinder 130 is shown including a cylinder fuel injector 66. Fuel injector 66 is shown coupled directly to combustion chamber 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. In another example, injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions. Furthermore, for a single combustion event, multiple injections of the delivered fuel may be performed per cycle. The multiple injections may be performed during the compression stroke, intake stroke, or any appropriate combination thereof.

In the example shown in FIG. 1, cylinder 130 includes a pre-chamber igniter 192 coupled to cylinder head 18 for initiating combustion, shown in more detail in FIGS. 2A-3B. Pre-chamber igniter 192 includes a spark plug having a spark gap and further includes an adjustable pre-chamber cap and an internal cavity, referred to herein as a pre-chamber 188. Further, the walls of pre-chamber igniter 192, which enclose pre-chamber 188, include a plurality of openings. Each opening may provide an orifice between pre-chamber 188 and cylinder 130, fluidically coupling pre-chamber 188 to an interior of cylinder 130. The interior of cylinder 130 may be referred to herein as a main combustion chamber. Thus, during some conditions, gases may flow between pre-chamber 188 and the interior of cylinder 130 (e.g., the main combustion chamber of cylinder 130). For example, gases (e.g., air, fuel, and/or residual combustion gases) may flow through each opening with a directionality and rate based on a pressure difference across the opening (e.g., between pre-chamber 188 and the interior of cylinder 130). Further, each opening provides an ignition flame (or jet) to cylinder 130, as will be elaborated with respect to FIGS. 2A-3B.

An ignition system 88 may produce an ignition spark in pre-chamber igniter 192 in response to a spark advance signal SA from controller 12 under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event, or to provide a torque reserve. When pre-chamber igniter 192 is actuated, the air-fuel mixture within the pre-chamber may combust, the increased pressure of combustion sending jets of flame into cylinder 130 via the plurality of openings in the pre-chamber walls. The plurality of openings may be arranged such that the jets of flame are evenly distributed in cylinder 130. The jets of flame may ignite the air-fuel mixture in cylinder 130, causing combustion.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 46, an engine coolant temperature signal (ECT) from a temperature sensor 112 coupled to coolant sleeve 114, signal UEGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, pre-chamber igniter 192, the intake/exhaust valves and cams, etc. The controller may receive input data from the various sensors, process the input data, and trigger the actuators in response to the processed input data based on instructions or code programmed therein corresponding to one or more routines, an example of which is described with respect to FIG. 6.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), igniter, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Figure 2A:
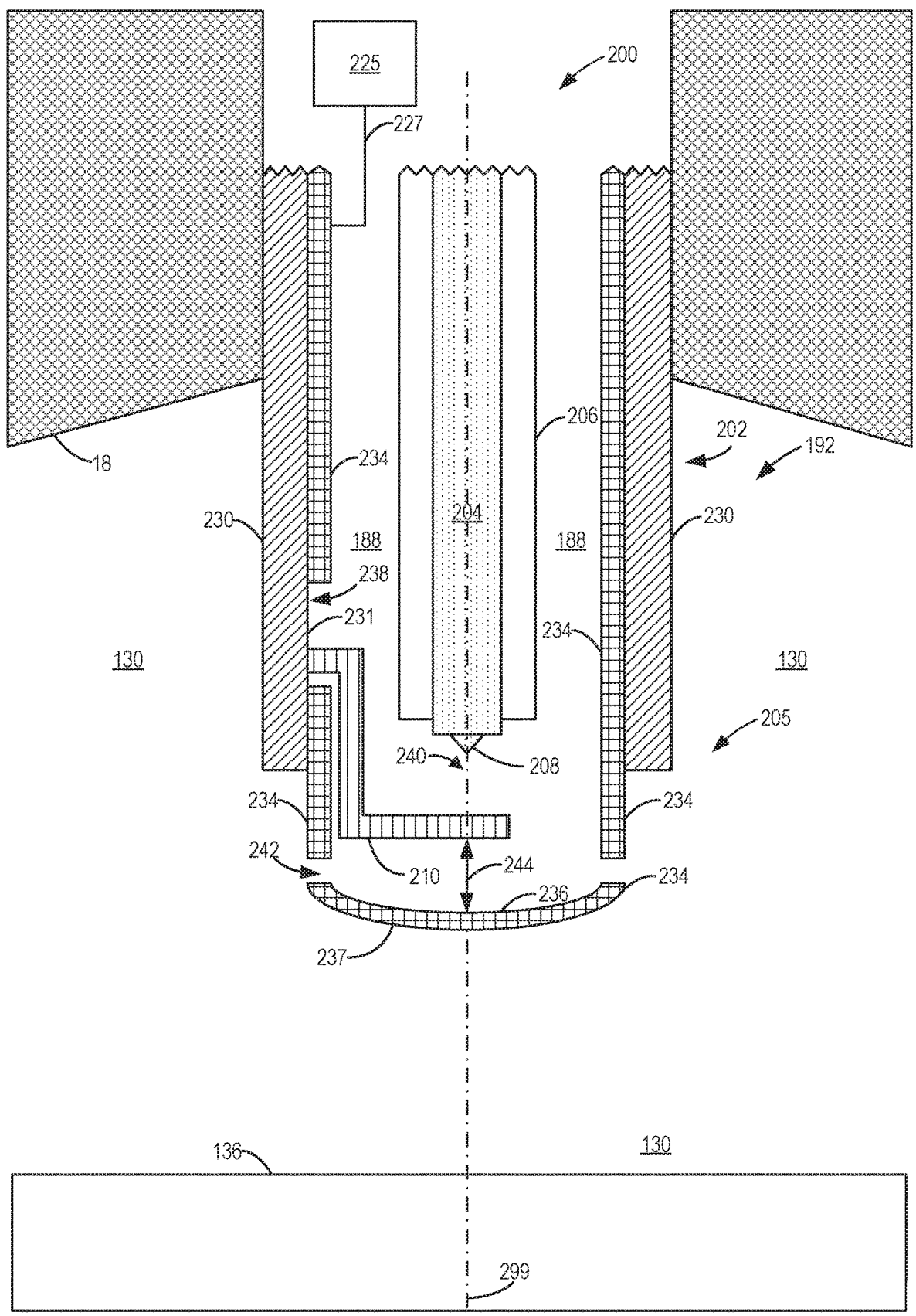
FIG. 2A schematically shows a detailed view of a first example of a variable volume pre-chamber system with an adjustable pre-chamber cap in a first position.
Figure 2B:
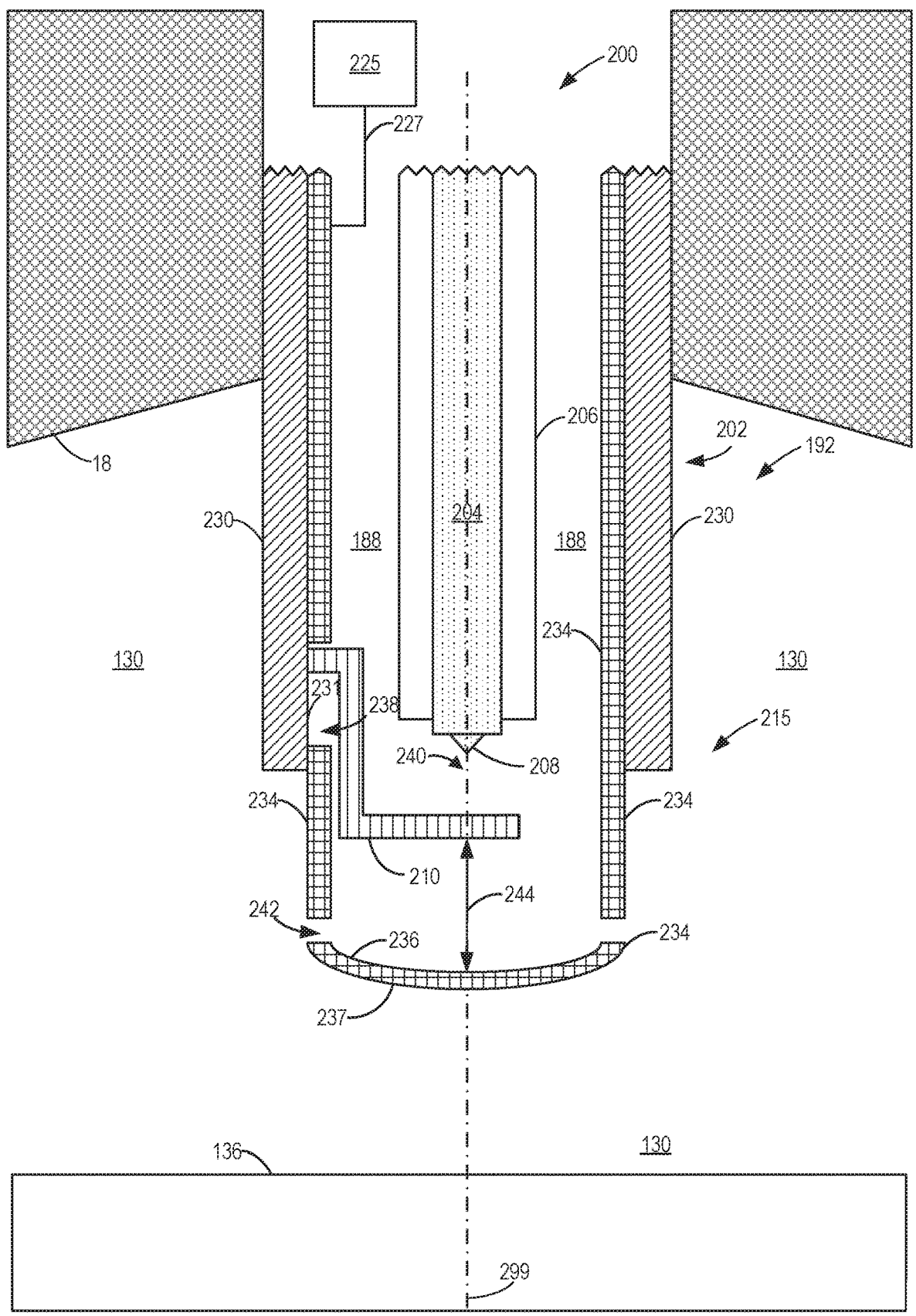
FIG. 2B schematically shows a detailed view of the variable volume pre-chamber igniter of FIG. 2A with the adjustable pre-chamber cap in a second position.

Next, FIGS. 2A and 2B show symmetrical cross-sectional views of a first variable volume pre-chamber igniter 200, which may be one example of pre-chamber igniter 192 introduced in FIG. 1. As such, components previously introduced in FIG. 1 are numbered the same in FIGS. 2A and 2B and will not be reintroduced. Further, FIGS. 2A and 2B are substantially identical except for the position of an adjustable pre-chamber cap 234 and will be described collectively. In particular, FIG. 2A shows variable volume pre-chamber igniter 200 with adjustable pre-chamber cap 234 in a first position 205, where a volume of pre-chamber 188 is smaller, and FIG. 2B shows pre-chamber igniter 192 with adjustable pre-chamber cap 234 in a second position 215, where the volume of pre-chamber 188 is larger.

As shown in FIGS. 2A and 2B and elaborated above with respect to FIG. 1, cylinder 130 includes cylinder head 18. Further, variable volume pre-chamber igniter 200 includes a pre-chamber body 202, which may form a substantially cylindrical tube with a central axis 299. In particular, pre-chamber body 202 may include an exterior surface 230 and an interior surface 231, and at least portions of exterior surface 230 may be coupled to cylinder head 18. As one example, exterior surface 230 may be threaded into cylinder head 18. Together, pre-chamber body 202 and adjustable pre-chamber cap 234 may provide walls that divide (e.g., separate) pre-chamber 188 from main combustion chamber 130. Central axis 299 may be perpendicular to a surface of piston 136 (only a portion of which is shown in FIGS. 2A and 2B) and parallel to cylinder walls 132 shown in FIG. 1, for example. Further, a portion of exterior surface 230 of pre-chamber body 202 may be disposed in main combustion chamber 130 and may be directly or indirectly coupled to an electrical ground. In alternative embodiments, the pre-chamber body 202 may not be a substantially cylindrical tube. For example, it may be oval, kidney-shaped, or rectangular.

Adjustable pre-chamber cap 234 may be a substantially cylindrical capped tube having a continuous wall that is parallel to central axis 299 and a disk-like base capping the wall that is substantially perpendicular to central axis 299. A portion of adjustable pre-chamber cap 234 is positioned within and surrounded by pre-chamber body 202. In the example shown, an upper portion of the wall of adjustable pre-chamber cap 234 is encircled by pre-chamber body 202, with an outer surface of adjustable pre-chamber cap 234 having a smaller diameter than interior surface 231 of pre-chamber body 202. The disk-like base of adjustable pre-chamber cap 234 includes a bottom inner surface 236 and a bottom outer surface 237. Bottom outer surface 237 is the closest surface of adjustable pre-chamber cap 234 to piston 136. A distance between a top surface of piston 136 and bottom outer surface 237 is larger when adjustable pre-chamber cap 234 is in the first (retracted) position 205 of FIG. 2A and smaller when adjustable pre-chamber cap 234 is in the second (extended) position 215 of FIG. 2B. Thus, adjustable pre-chamber cap 234 is retracted from piston 136 (and toward cylinder head 18) in first position 205 and extended toward piston 136 (and away from cylinder head 18) in second position 215.

Adjustable pre-chamber cap 234 may be linearly movable along central axis 299 between first position 205 (FIG. 2A) and second position 215 (FIG. 2B) via an actuator 225. For example, actuator 255 may adjust the position adjustable pre-chamber cap 234 in a direction that is parallel to central axis 299. Actuator 225 may be positioned inside or above pre-chamber body 202, for example, and may be a solenoid, an electric motor, a pneumatic actuator, a vacuum actuator, a hydraulic actuator, or the like. Actuator 225 may be directly coupled to adjustable pre-chamber cap 234, and may thereby act directly on adjustable pre-chamber cap 234, or may be indirectly coupled to adjustable pre-chamber cap through a linkage, cam, etc. In the example shown, adjustable pre-chamber cap 234 is coupled to actuator 225 via a mechanical linkage 227, and thus, movement of actuator 225 may be transferred to adjustable pre-chamber cap 234 via mechanical linkage 227. Actuator 225 may adjust adjustable pre-chamber cap 234 between two or more distinct positions including first position 205 and second position 215. In some examples, actuator 225 may continuously vary the position of adjustable pre-chamber cap 234 between first position 205 and second position 215. Actuator 225 may move adjustable pre-chamber cap 234 vertically in the orientation shown in FIGS. 2A and 2B. In alternative embodiments, adjustable pre-chamber cap 234 may be movable in a non-linear fashion. For example, adjustable pre-chamber cap 234 may pivot or rotate between two or more positions.

Variable volume pre-chamber igniter 200 further includes an electrode 204 encased in insulation 206. Electrode 204 may be a cylindrical electrode positioned to be coaxial with central axis 299, and insulation 206 may be a hollow cylinder coaxial with axis 299. Further, an inner radius of insulation 206 may be approximately equal to an outer radius of electrode 204 so that an inner surface of insulation 206 is in direct contact with an outer surface of electrode 204. An outer radius of insulation 206 may be smaller than an inner radius of adjustable pre-chamber cap 234, resulting in a radial gap between insulation 206 and adjustable pre-chamber cap 234. The radial gap between pre-chamber body 202 and insulation 206 may at least partially define a hollow annular cavity forming pre-chamber 188. As such, pre-chamber 188 comprises an internal volume of variable volume pre-chamber igniter 200. An electrode tip 208 is shown coupled to electrode 204 at a distal end of electrode 204 (e.g., away from an attachment point at cylinder head 18), and is positioned in pre-chamber 188 along axis 299. For example, electrode 204 may be positioned entirely within pre-chamber 188.

Further, as shown in FIGS. 2A and 2B, variable volume pre-chamber igniter 200 includes a ground electrode 210 directly coupled to the interior surface 231 of pre-chamber body 202. As such, ground electrode 210 is indirectly coupled to an electrical ground via pre-chamber body 202. Further, in the example shown, ground electrode 210 extends into pre-chamber 188 and overlaps with a horizontal position of electrode tip 208. A vertical gap between ground electrode 210 and electrode tip 208 forms a spark gap 240, which is positioned entirely within pre-chamber 188. In the example shown, ground electrode 210 extends into pre-chamber 188 via a slot 238 in adjustable pre-chamber cap 234. Slot 238 may be sized to enable adjustable pre-chamber cap 234 to move between first position 205 and second position 215, for example. Further, slot 238 may be sealed from cylinder 130 via pre-chamber body 202. Thus, pre-chamber 188 may not be fluidically coupled to cylinder 130 via the slot 238.

As noted above, the volume of pre-chamber 188 is smaller when adjustable pre-chamber cap 234 is in first position 205 and larger when adjustable pre-chamber cap 234 is in second position 215. For example, the volume of pre-chamber 188 may be the smallest when adjustable pre-chamber cap 234 is in first position 205, which may be a fully retracted position of adjustable pre-chamber cap 234, and the largest when adjustable pre-chamber cap 234 is in second position 215, which may be a fully extended position of adjustable pre-chamber cap 234. As such, a distance 244 between bottom inner surface 236 of adjustable pre-chamber cap 234 and ground electrode 210 (e.g., at a position along central axis 299) is smaller (e.g., smallest) in first position 205 (FIG. 2A) and larger (e.g., largest) in second position 215 (FIG. 2B).

Further, adjustable pre-chamber cap 234 includes a plurality of openings 242 proximate to the disk-like base (e.g., proximate to bottom inner surface 236). Each opening 242 may provide an orifice between pre-chamber 188 and cylinder 130, fluidically coupling the internal volume of variable volume pre-chamber igniter 200 to the internal volume of cylinder 130. Thus, an air-fuel mixture may passively diffuse into pre-chamber 188 from cylinder 130 via openings 242 (e.g., due to a pressure difference across openings 242), where it may be ignited via a spark at spark gap 240. The hot gas/flame jet may then flow out of pre-chamber 188 to cylinder 130 via openings 242. In particular, the smaller volume of pre-chamber 188 achieved when adjustable pre-chamber cap 234 is in first position 205 (see FIG. 2A) may result in a faster pressure build up inside of pre-chamber 188 and more vigorous jets coming out of openings 242 relative to second position 215 (see FIG. 2B). As such, first position 205 may provide a more robust ignition for combustion in cylinder 130, which may result in increased cylinder power and efficiency. However, the smaller volume of pre-chamber 188 in first position 205 may quench the flame at light loads and/or during a cold start. Therefore, the larger volume of pre-chamber 188 achieved when adjustable pre-chamber cap 234 is in second position 215 may provide increased combustion stability in the pre-chamber, and thus more reliable ignition for combustion in cylinder 130 during light load and/or cold start conditions.

Figure 3A:
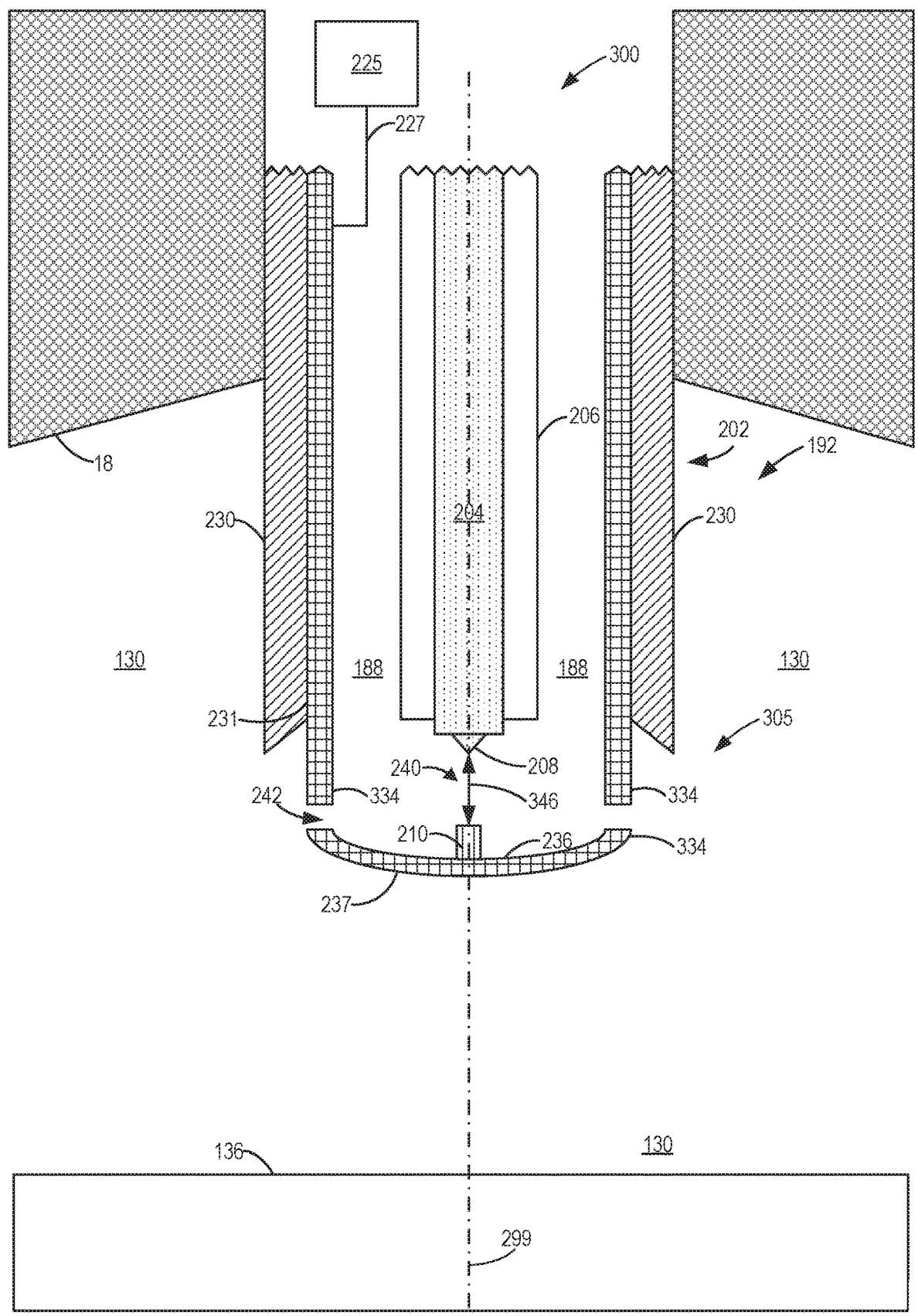
FIG. 3A schematically shows a detailed view of a second example of a variable volume pre-chamber igniter with an adjustable pre-chamber cap in a first position.
Figure 3B:
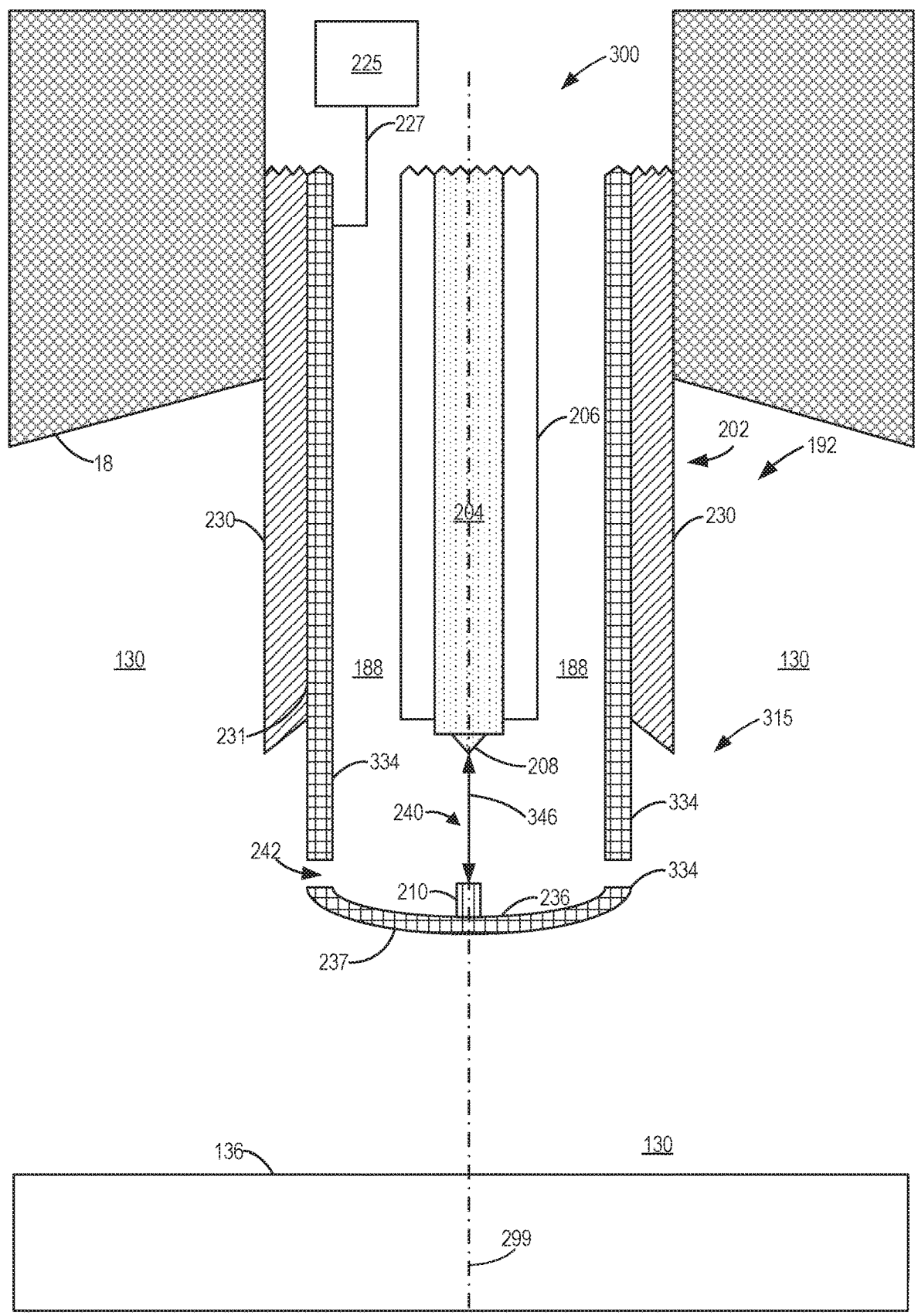
FIG. 3B schematically shows a detailed view of the variable volume pre-chamber igniter of FIG. 3A with the adjustable pre-chamber cap in a second position.

Next, FIGS. 3A and 3B show cross-sectional detailed views of a second variable volume pre-chamber igniter 300, which may be one example of pre-chamber igniter 192 introduced in FIG. 1. Components previously introduced in FIGS. 1-2B are numbered the same in FIGS. 3A and 3B and will not be reintroduced. For example, second variable volume pre-chamber igniter 300 is similar to first variable volume pre-chamber igniter 200 of FIGS. 2A and 2B except for the differences described below.

Similar to adjustable pre-chamber cap 234 of FIGS. 2A and 2B, an adjustable pre-chamber cap 334 of second variable volume pre-chamber igniter 300 is adjustable between a first position 305 (see FIG. 3A) and a second position 315 (see FIG. 3B) via actuator 225. The volume of pre-chamber 188 is smaller (e.g., smallest) when adjustable pre-chamber cap 334 is in first position 305 and larger (e.g., largest) when adjustable pre-chamber cap 334 is in second position 315, as elaborated above with respect to FIGS. 2A and 2B. For example, first position 305 may be a fully retracted position of adjustable pre-chamber cap 334, while second position 315 may be a fully extended position of adjustable pre-chamber cap 334. As described above with respect to adjustable pre-chamber cap 234 of FIGS. 2A and 2B, adjustable pre-chamber cap 334 may be adjustable between a plurality of positions between first position 305 and second position 315, at least in some examples. Further, first position 305 may be the same as first position 205 of FIG. 2A, and second position 315 may be the same as second position 215 of FIG. 2B, at least in some examples.

Second variable volume pre-chamber igniter 300 includes ground electrode 210 directly coupled to a disk-like based of adjustable pre-chamber cap 334, aligned with electrode 204 along central axis 299. As shown, ground electrode 210 is directly coupled to bottom inner surface 236 of adjustable pre-chamber cap 334. As such, adjustable pre-chamber cap 334 also does not include slot 238 that is present in adjustable pre-chamber cap 234 of FIGS. 2A and 2B. Because ground electrode 210 is directly coupled to bottom inner surface 236 of adjustable pre-chamber cap 334, a distance 346 between electrode tip 208 and ground electrode 210 also varies as adjustable pre-chamber cap 334 is adjusted between first position 305 and second position 315. As such, distance 346, which comprises a length of spark gap 240 in second variable volume pre-chamber igniter 300, is smaller (e.g., smallest) in first position 305 (see FIG. 3A) and larger (e.g., largest) in second position 310 (see FIG. 3B). The larger spark gap 240 in second position 315 (see FIG. 3B) may increase ignitability at light loads, which is also when a larger pre-chamber volume is desired for greater combustion stability, as described above with respect to FIG. 2B.

FIGS. 2A-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 4:
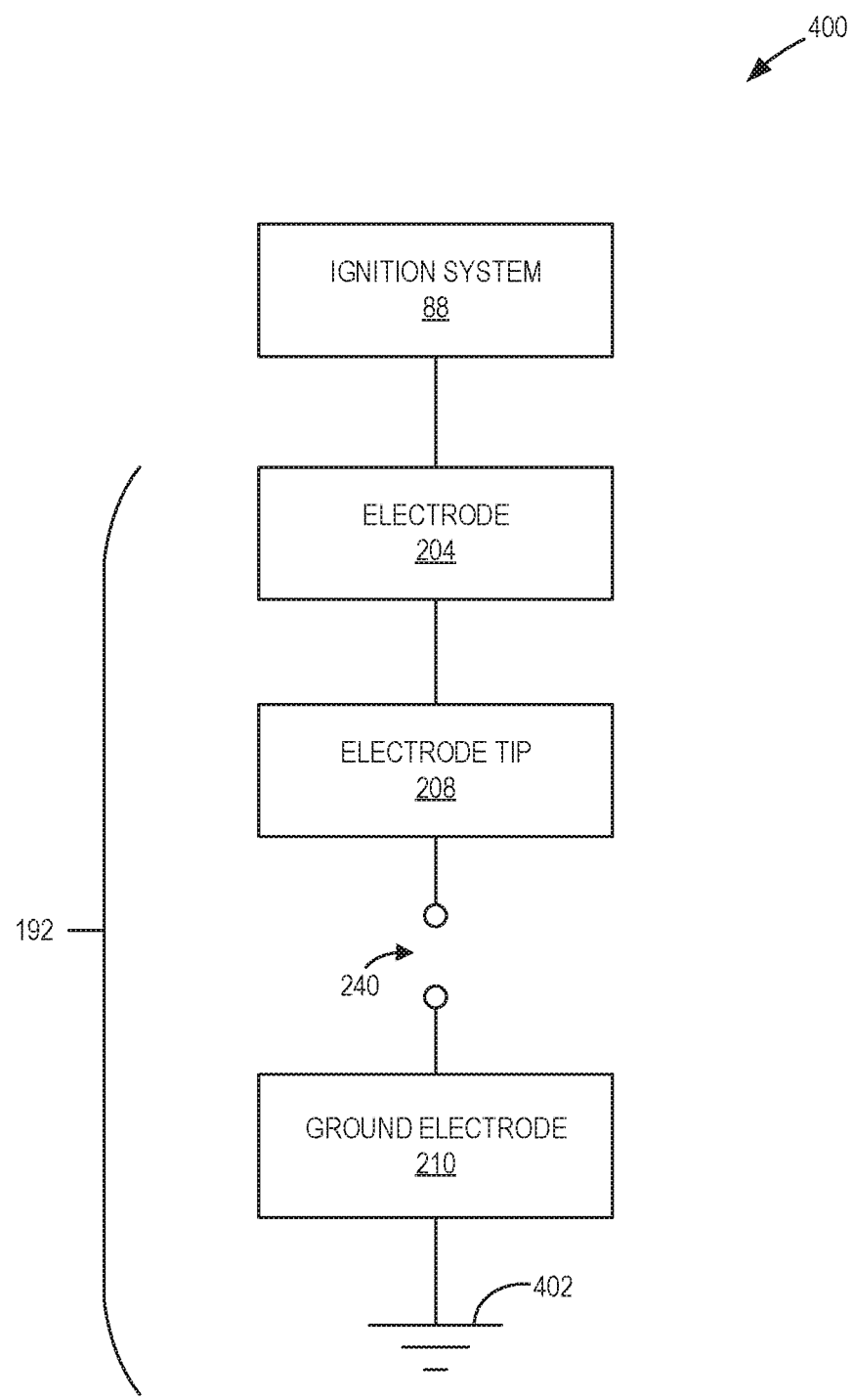
FIG. 4 shows a view of an example wiring diagram for a variable volume pre-chamber igniter having an adjustable cap.
Figure 5:
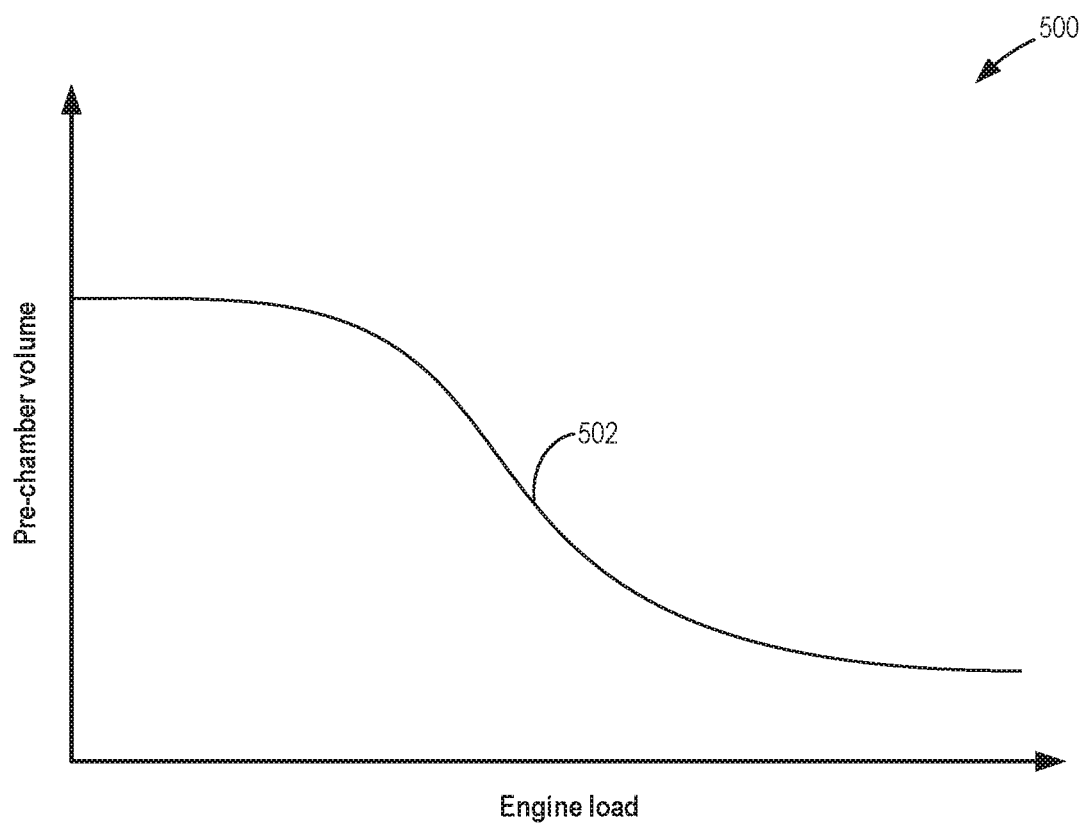
FIG. 5 shows a graph depicting an example relationship between a pre-chamber volume and engine load for optimizing ignitability and ignition speed.

Next, FIG. 4 schematically shows an example wiring diagram 400 for a pre-chamber igniter, such as pre-chamber igniter 192 of FIG. 1. In particular, pre-chamber igniter 192 may be first variable volume pre-chamber igniter 200 of FIGS. 2A and 2B or second variable volume pre-chamber igniter 300 of FIGS. 3A and 3B. As such, components of FIG. 4 that function the same as components introduced in FIGS. 1-3B are numbered same and will not be reintroduced.

Pre-chamber igniter 192 is powered by ignition system 88, which may include one or more ignition coils. In particular, ignition system 88 is coupled to electrode 204 of pre-chamber igniter 192. Further, electrode 204 is directly coupled to electrode tip 208, and electrode tip 208 is coupled to ground electrode 210 via a spark gap 240. Ground electrode 210 is coupled to an electrical ground 402. For example, ground electrode tip 218 may be coupled to pre-chamber body 202 (see FIGS. 2A and 2B) or to adjustable pre-chamber cap 334 (see FIGS. 3A and 3B), which may be electrically grounded. Thus, electrode 204 is electrically coupled to electrical ground 402 only when a voltage differential between electrode tip 208 and ground electrode 210 is higher than a threshold voltage differential sufficient to cross spark gap 240.

As an example, when the space between electrode tip 208 and ground electrode 210 (e.g., spark gap 240) is occupied by an air-fuel mixture in the pre-chamber (e.g., pre-chamber 188 of FIGS. 1-3B), the threshold voltage differential may be a breakdown voltage of the air-fuel mixture. A breakdown voltage of a material may be defined as the applied voltage at which the material becomes electrically conductive and acts as a conduit for current. The breakdown voltage may vary as a function of pressure, a distance between terminals, and physical properties of the material. Thus, the breakdown voltage of the air-fuel mixture may be the voltage at which the air-fuel mixture in the pre-chamber becomes electrically conductive and acts as a conduit for electrical current flowing between electrode tip 208 and ground electrode 210. When the voltage differential between electrode tip 208 and ground electrode 210 exceeds the threshold voltage differential (e.g., when the voltage differential between electrode tip 208 and ground electrode 210 exceeds the breakdown voltage of the air-fuel mixture in spark gap 240), a current may flow across spark gap 240, generating a spark. Thus, in some examples, when pre-chamber 188 contains an air-fuel mixture while a voltage differential greater than the threshold voltage differential is applied to spark gap 240, the spark across spark gap 240 may ignite the pre-chamber air-fuel mixture.

In this way, pre-chamber igniter 192 is coupled to ignition system 88 via a direct connection between ignition system 88 and electrode 204, while pre-chamber igniter 192 is connected to ground via a connection between ground electrode 210 and electrical ground 402. When ground electrode 210 is connected to electrical ground 402 and ignition system 88 provides a current to electrode 204 (e.g., when pre-chamber igniter 192 is actuated), the voltage differential between electrode 204 and ground electrode 210 may exceed the threshold voltage differential (e.g., the breakdown voltage of an air-fuel mixture in spark gap 240), and thus current may flow across the spark gap 240 from electrode 204 to ground electrode 210, generating a spark in the pre-chamber that initiates combustion of the air-fuel mixture in the pre-chamber. Ignition jets of flame and hot air from combustion in the pre-chamber may flow out of the pre-chamber (e.g., via openings 242 shown in FIGS. 2A-3B) to initiate combustion in a main combustion chamber (e.g., cylinder 130 shown in FIGS. 1-3B).

Turning now to FIG. 5, a graph 500 shows a plot 502 of an example relationship between pre-chamber volume and engine load. For example, the relationship shown in plot 502 may represent an optimum pre-chamber volume at the given engine load and may be determined by weighing the ignitability in the pre-chamber against the ignition speed of a main combustion chamber. The engine may be engine 10 in FIG. 1, including cylinder 130 and pre-chamber igniter 192, for example. The horizontal axis represents the engine load, with the engine load increasing along the horizontal axis from left to right, and the vertical axis represents the pre-chamber volume, with the pre-chamber volume increasing up the vertical axis. Note that the shape of plot 502 is one example of a relationship between the pre-chamber volume and the engine load, and other shapes are also possible. For example, plot 502 may be linear, stepped, or another type of curve.

As shown by plot 502, the volume of the pre-chamber generally increases as the engine load decreases in order to maintain robust ignitability in the pre-chamber. For example, during high load conditions, a smaller pre-chamber volume may be used so that pressure builds up more quickly in the pre-chamber. Additionally, jets of flame and hot combustion gases (e.g., ignition jets) may exit the smaller volume pre-chamber with a higher velocity, thus providing more robust ignition to the main combustion chamber. For example, an adjustable pre-chamber cap may be maintained at a first position (which may be first position 205 of FIG. 2A or first position 305 of FIG. 3A, for example) that corresponds to the smaller pre-chamber volume during higher load conditions. In contrast, during low load conditions, flame kernel quenching may be reduced by operating with a larger pre-chamber volume. For example, the adjustable pre-chamber cap may be maintained at a second position (which may be second position 215 of FIG. 2B or second position 315 of FIG. 3B, for example) that corresponds to the larger pre-chamber volume during lower load conditions in order to increase ignitability in the pre-chamber.

Figure 6:
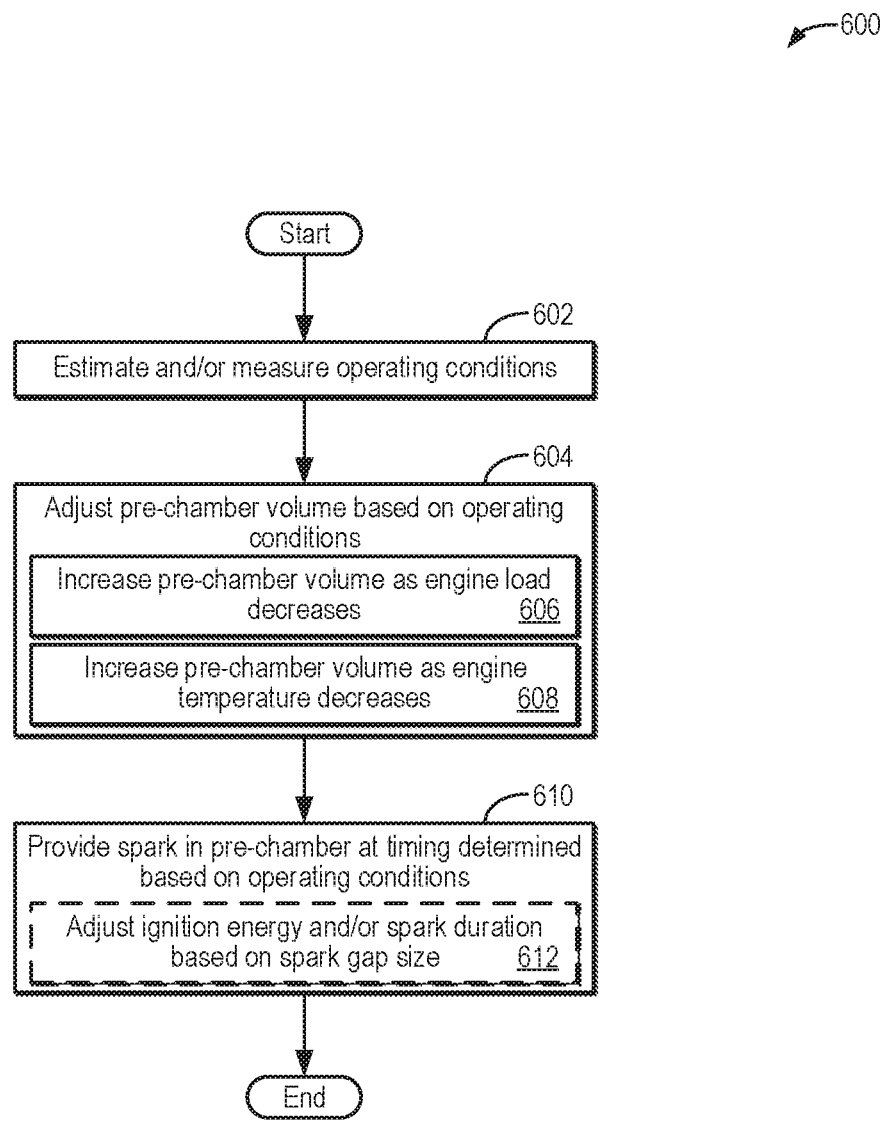
FIG. 6 shows an example method for operating a variable volume pre-chamber responsive to engine operating conditions.
Figure 7:
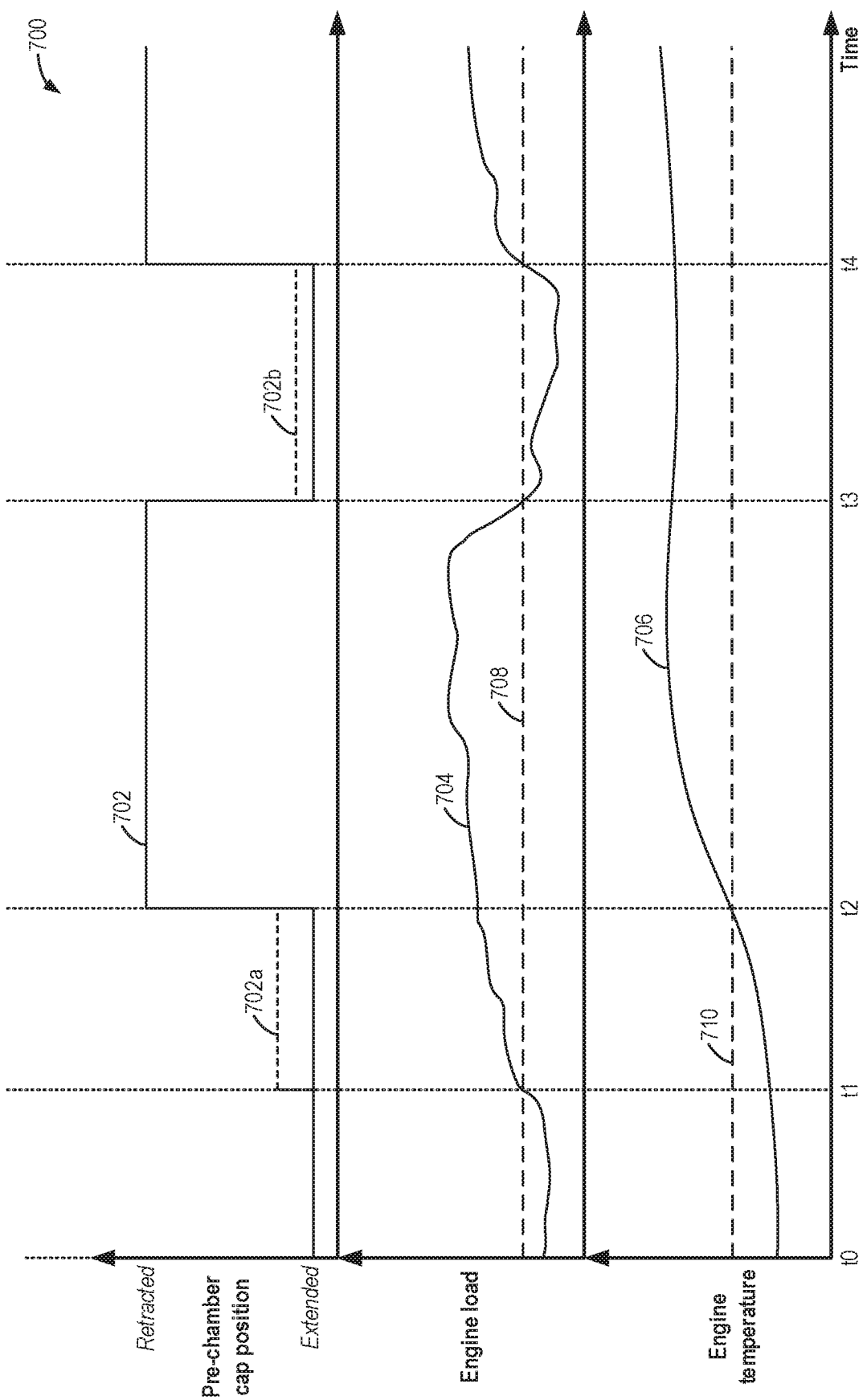
FIG. 7 shows a prophetic example timeline for adjusting a position of an adjustable cap of a variable volume pre-chamber based on engine operating conditions.

FIG. 6 shows an example method 600 for operating a variable volume pre-chamber igniter to provide ignition to a cylinder. For example, operating the variable volume pre-chamber igniter may include adjusting a position of an adjustable pre-chamber cap based on engine operating conditions. As illustrated in FIGS. 1-3B, variable volume pre-chamber igniter may be located in a clearance volume of the cylinder and may include a spark gap within a pre-chamber. The variable volume pre-chamber igniter may be first variable volume pre-chamber igniter 200 of FIGS. 2A and 2B or second variable volume pre-chamber igniter 300 of FIGS. 3A and 3B, although method 600 may be applied in other systems that include a variable volume pre-chamber igniter. Instructions for carrying out method 600 may be executed by a controller, such as controller 12 of FIG. 1, based on instructions stored on a memory of the controller and in conjunction with signals received from sensors of the engine system, such as the sensors described with reference to FIG. 1. The controller may employ engine actuators of the engine system to adjust engine operation according to the methods described below. Method 600 will be described with respect to a single cylinder and variable volume pre-chamber pair, although method 600 may be performed simultaneously for a plurality of cylinders in a multi-cylinder engine.

At 602, method 600 includes estimating and/or measuring operating conditions. The operating conditions may include, for example, an engine speed, an engine load, a cylinder AFR, an exhaust gas AFR, an engine temperature, an accelerator pedal position, a brake pedal position, and an exhaust gas temperature. The operating conditions may be measured by one or more sensors communicatively coupled to the controller or may be inferred based on available data. For example, the controller may estimate the engine load by inputting a throttle position and a mass air flow (MAF) sensor reading into one or more look-up tables, maps, or functions, which may output the engine load. As another example, the engine temperature may be measured by an engine coolant temperature sensor, such as ECT sensor 112 of FIG. 1. As yet another example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque.

At 604, method 600 includes adjusting a volume of a pre-chamber of the variable volume pre-chamber igniter based on the operating conditions (e.g., the operating conditions estimated/measured at 602). In particular, when the engine load is less than a threshold engine load and/or the engine temperature is less than a threshold temperature, a smaller volume pre-chamber may quench a flame kernel in the pre-chamber before combustion is initiated. Therefore, the controller may adjust the volume of the pre-chamber based on the engine load and the engine temperature. Adjusting the volume of the pre-chamber based on the operating conditions includes increasing the pre-chamber volume as the engine load increases, as indicated at 606, and increasing the pre-chamber volume as the engine temperature decreases, as indicated at 608.

In one example, the controller may compare the engine load to the threshold load, and responsive to the engine load being less than the threshold load, the controller may increase the pre-chamber volume. The threshold load may be a pre-determined value stored in memory and may distinguish low load operating conditions from mid and high load operating conditions, for example. To increase the pre-chamber volume, the controller may adjust the pre-chamber cap to an extended position, for example. In the extended position (e.g., second position 215 of FIG. 2B or second position 315 of FIG. 3B), the pre-chamber cap is pushed out relative to a body of the pre-chamber that couples to the cylinder and extends further into the main combustion chamber of the cylinder, thus increasing the volume inside the pre-chamber. In some examples, the pre-chamber cap may be adjusted to a fully extended position at which the pre-chamber volume is at a maximum volume responsive to the engine load being less than the threshold load. In other examples, the pre-chamber cap may be extended to a further degree as the engine load further decreases below the threshold load until the fully extended, maximum volume position is reached. The pre-chamber cap may be adjusted to via an actuator (e.g., actuator 225 of FIGS. 2A-3B).

Conversely, responsive to the engine load being greater than or equal to the threshold load, the controller may decrease the pre-chamber volume. To decrease the pre-chamber volume, the controller may adjust the pre-chamber cap to a retracted position, for example. In the retracted position (e.g., first position 205 of FIG. 2A or first position 305 of FIG. 3A), the pre-chamber cap is pulled in toward the body of the pre-chamber and extends into the main combustion chamber of the cylinder to a smaller degree, thus decreasing the volume inside the pre-chamber. In some examples, the pre-chamber cap may be adjusted to a fully retracted position at which the pre-chamber volume is at a minimum volume responsive to the engine load being greater than or equal to the threshold load. In other examples, the pre-chamber cap may be retracted to a further degree as the engine load further increases above the threshold load until the fully retracted, minimum volume position is reached.

As another example, the controller may compare the engine temperature to the threshold temperature, and responsive to the engine temperature being less than the threshold temperature, the controller may increase the pre-chamber volume in the manner described above for the engine load. The threshold temperature may be a pre-determined value stored in memory and may occur during cold start conditions, before the engine reaches a nominal operating temperature, for example. Conversely, responsive to the engine temperature being greater than or equal to the threshold temperature, the controller may decrease the pre-chamber volume in the manner described above for the engine load.

In still other examples, instead of adjusting the pre-chamber volume based on the engine temperature and/or the engine load relative to corresponding thresholds, the controller may directly determine a position to use for the pre-chamber cap based on the engine load and the engine temperature, such as by inputting the engine load and the engine temperature into a look-up table, algorithm, or map stored in memory. The look-up table, algorithm, or map may output the corresponding position for the pre-chamber cap, which may be any position between and including the fully extended position and the fully retracted position. The controller may then adjust the pre-chamber cap to the determined position via the actuator.

At 610, method 600 includes providing spark in the pre-chamber via an electrode (e.g., electrode 204 of FIGS. 2A-4) at a timing determined based on the operating conditions. For example, the controller may input the operating conditions, such as the engine speed, the engine load, and the engine torque demand, into a look-up table, algorithm, or map, which may output the timing for energizing the electrode to provide spark (e.g., a spark timing) according to the input operating conditions. The controller may then actuate the electrode at the determined spark timing, such as via a spark advance signal from an ignition system (e.g., ignition system 88 show in FIGS. 1 and 4). In some examples, the controller may further account for the pre-chamber volume in determining the spark timing, as the pre-chamber may become pressurized at a faster rate and may produce higher velocity ignition jets when the pre-chamber volume is smaller. For example, the controller may adjust the determined spark timing as a function of the position of the pre-chamber cap and/or the corresponding pre-chamber volume. In another example, because the pre-chamber volume may be adjusted based on the operating conditions, the look-up table, algorithm, or map may already account for the varying pre-chamber volume across operating conditions.

In examples where a ground electrode is directly coupled to the pre-chamber cap, the position of the pre-chamber cap also varies a spark gap size within the pre-chamber. In such examples, method 600 includes adjusting an ignition energy and/or spark duration based on the spark gap size, as optionally indicated at 612. For example, the ignition energy and/or the spark duration may be increased as the spark gap size increases (e.g., the pre-chamber cap is further extended) and decreased as the spark gap size decreases (e.g., the pre-chamber gap is further retracted). The controller may directly determine the ignition energy and/or the spark duration based on the position of the pre-chamber cap and/or the volume of the pre-chamber, such as by inputting the position and/or volume into a look-up table, algorithm, or map stored in memory. When high ignition energy and/or long spark duration are not indicated due to a smaller spark gap (e.g., when the pre-chamber volume is smaller), decreased ignition energy and/or spark duration cause less erosion of the spark plug electrodes. The controller may energize the pre-chamber electrode with the determined ignition energy at the determined ignition timing for the determined spark duration in order to robustly provide ignition to the cylinder at any pre-chamber volume between and including the minimum volume and the maximum volume. Method 600 may then end.

Turning now to FIG. 7, a prophetic example timeline 700 of operating an engine having a variable volume pre-chamber igniter is shown. The engine may be engine 10 in FIG. 1, including cylinder 130, for example, and the variable volume pre-chamber igniter may be variable volume pre-chamber igniter 200 of FIGS. 2A and 2B or variable volume pre-chamber igniter 300 of FIGS. 3A and 3B. Although some parameters are shown for a single pre-chamber in FIG. 7, it may be understood that the cylinder may be included in a multi-cylinder engine system, and similar adjustments may be performed for each cylinder's pre-chamber. An indication of the pre-chamber cap position is shown by a plot 702, an engine load is shown in a plot 704, and an engine temperature is shown in a plot 706. For all of the above, the horizontal axis represents time, with time increasing along the horizontal axis from left to right. The vertical axis represents each labeled parameter. For each of plots 704 and 706, a magnitude of the parameter increases up the vertical axis. For plot 702, the vertical axis shows the position of the pre-chamber cap relative to a furthest retracted position ("retracted") and a furthest extended position ("extended"). For example, when the pre-chamber cap is in the extended position, the pre-chamber volume is at a maximum volume, and when the pre-chamber cap is in the retracted position, the pre-chamber volume is at a minimum volume. Further, a threshold engine load is shown by a dashed line 708, and a threshold engine temperature is shown by a dashed line 710.

At time t0, the engine is started. Because the engine has not been recently operated, the engine temperature (plot 706) is less than a threshold engine temperature (dashed line 710), indicating that a cold start condition is present. With the engine temperature less than the threshold engine temperature, ignitability in the pre-chamber is decreased. Further, the engine is operated a low load (plot 704) that is less than the threshold engine load. With the engine load less than the threshold engine load, the ignitability in the pre-chamber is further decreased. Therefore, in order to increase pre-chamber ignitability and decrease an occurrence of cylinder misfire, the pre-chamber is operated with the pre-chamber cap in the extended position (plot 702), which increases the volume of the pre-chamber to the maximum volume. As a result, a likelihood that a flame kernel will be quenched in the pre-chamber before combustion is initiated in the main combustion chamber of the cylinder is decreased. Further, ignition timing, ignition energy, and/or spark duration adjustments may be made to compensate for timing differences and/or a larger spark gap size relative to when the pre-chamber cap is less extended and the pre-chamber volume is smaller, as described above with respect to FIG. 6.

At time t1, the engine load (plot 704) increases above the threshold engine load (dashed line 708). At engine loads above the threshold engine load, an occurrence of the flame kernel being quenched is decreased, enabling a smaller pre-chamber volume to be used in order to provide more robust ignition to the main combustion chamber. However, the engine temperature (plot 706) remains below the threshold engine temperature (dashed line 710). Therefore, the pre-chamber cap is maintained in the extended position (plot 702), and the pre-chamber continues to be operated with the maximum volume.

In some examples, the pre-chamber cap may be adjusted between a plurality of positions between the retracted position and the extended position. Therefore, as an alternative example shown by a dashed segment 702a, in response to the engine load (plot 704) increasing above the threshold engine load (dashed line 708) at time t1, the pre-chamber cap is adjusted to a less extended position while still remaining closer to the extended position than the retracted position. For example, the ignitability in the pre-chamber may be lower than when the engine is warmer (e.g., when the engine temperature shown in plot 706 is greater than the threshold engine temperature shown in dashed line 710), but higher than when the engine is cold and when the engine load is low (e.g., lower than the threshold engine load shown in dashed line 708). Therefore, the less extended position shown by dashed segment 702a may enable the pressure in the pre-chamber to build up faster than when the pre-chamber cap is in the fully extended position for faster main chamber ignition while also preventing the flame kernel from being quenched.

At time t2, the engine temperature (plot 706) increases above the threshold engine temperature (dashed line 710). Further, the engine load (plot 704) remains above the threshold engine load (dashed line 708). As a result of the engine load being greater than the threshold engine load and the engine temperature being above the threshold engine temperature, the ignitability in the pre-chamber is increased, and a larger pre-chamber volume is no longer requested to compensate for decreased ignitability. In response, the pre-chamber cap is adjusted to the retracted position (plot 702), which decreases the pre-chamber volume relative to when the pre-chamber cap is in the extended position. Further, ignition timing, ignition energy, and/or spark duration adjustments may be made to compensate for timing differences and/or a smaller spark gap size relative to when the pre-chamber cap is more extended and the pre-chamber volume is larger, as described above with respect to FIG. 6.

At time t3, the engine load (plot 704) decreases below the threshold engine load (dashed line 708). Although the engine temperature (plot 706) remains above the threshold engine temperature (dashed line 710), the decreased engine load decreases ignitability in the pre-chamber. Therefore, in response, the pre-chamber cap is adjusted to the extended position (plot 702), and the pre-chamber is operated with the maximum volume.

As an alternative example shown by a dashed segment 702b, in response to the engine load (plot 704) decreasing below the threshold engine load (dashed line 708) at time t3 while the engine temperature (plot 706) remains above the threshold engine temperature (dashed line 710), the pre-chamber cap is adjusted to a partially extended position. For example, the ignitability in the pre-chamber may be higher than when the engine is both cold and operating at a low load (e.g., as between time t0 and time t1). Further, the engine load may have a greater effect on the ignitability than the engine temperature, at least in some examples, resulting in the position shown in dashed segment 702b being more extended than the position shown in dashed segment 702a. The partially extended position shown by dashed segment 702b may enable the pressure in the pre-chamber to build up faster than when the pre-chamber cap is in the fully extended position while also preventing the flame kernel from being quenched.

At time t4, the engine load (plot 704) again increases above the threshold engine load (dashed line 708). Further, the engine temperature (plot 706) remains above the threshold engine temperature (dashed line 710). In response to the engine load increasing above the threshold engine load, the pre-chamber cap is adjusted back to the retracted position (plot 702), and the pre-chamber is operated at the minimum volume. As a result, the pre-chamber becomes pressurized more quickly relative to when the pre-chamber volume is larger, and higher velocity ignition jets robustly initiate combustion in the main combustion chamber.

In this way, robust pre-chamber ignition is provided over a wider range of operating conditions relative to a fixed geometry pre-chamber. By including an adjustable pre-chamber cap to vary the pre-chamber volume (and, in some examples, spark gap size), the pre-chamber may be reliably operated at low engine loads and temperatures while a cost and of the pre-chamber igniter is lower relative to active pre-chambers that include an additional fuel injector inside the pre-chamber. Due to the smaller size (diameter) of the variable volume pre-chamber described herein relative to active pre-chambers, larger intake and exhaust valves may be used in the engine, resulting in higher engine power capability. Overall, by providing reliable ignition via a passive, variable volume pre-chamber across a range of operating conditions, an occurrence of misfire may be decreased while engine efficiency may be increased.

The technical effect of varying a volume inside a pre-chamber via an adjustable cap based on operating conditions is that an occurrence of cylinder misfire at lower engine loads and temperature is decreased while an engine efficiency is increased.

As one example, a system comprises: a pre-chamber igniter coupled to a cylinder of an engine, the pre-chamber igniter comprising a cap dividing an internal volume of the pre-chamber igniter from an internal volume of the cylinder, the cap movable between a first position and a second position. In a first example of the system, the internal volume of the pre-chamber igniter is smaller when the cap is in the first position and larger when the cap is in the second position. In a second example of the system, optionally including the first example, the cap extends further toward a piston of the cylinder in the second position relative to the first position, and wherein the cap includes one or more openings that fluidically couple the internal volume of the pre-chamber igniter to the internal volume of the cylinder. In a third example of the system, optionally including one or both of the first and second examples, the pre-chamber igniter includes a spark gap within the internal volume of the pre-chamber igniter between an electrode tip and a ground electrode. In a fourth example of the system, optionally including any or all of the first through third examples, a bottom inner surface of the cap is closer to the electrode tip in the first position relative to the second position. In a fifth example of the system, optionally including any or all of the first through fourth examples, the ground electrode is coupled to the bottom inner surface of the cap, and the spark gap is smaller when the cap is in the first position relative to the second position. In a sixth example of the system, optionally including any or all of the first through fifth examples, the ground electrode is coupled to a body of the pre-chamber igniter, the body of the pre-chamber igniter surrounding an upper portion of the cap and fixedly coupled to a cylinder head of the cylinder. In a seventh example of the system, optionally including any or all of the first through sixth examples, the ground electrode extends from the body of the pre-chamber igniter into the internal volume of the pre-chamber igniter via a slot in the cap, the slot in the cap sealed from the internal volume of the cylinder via the body of the pre-chamber igniter and sized to enable movement of the cap between the first position and the second position. In an eighth example of the system, optionally including any or all of the first through seventh examples, the system further comprises: an actuator for adjusting the cap between the first position and the second position. In a ninth example of the system, optionally including any or all of the first through eighth examples, the actuator is one of a solenoid, an electric motor, a pneumatic actuator, a vacuum actuator, and a hydraulic actuator and is directly coupled to the cap. In a tenth example of the system, optionally including any or all of the first through ninth examples, the actuator is one of a solenoid, an electric motor, a pneumatic actuator, a vacuum actuator, and a hydraulic actuator and is indirectly coupled to the cap via at least one of a mechanical linkage and a cam.

As another example, a method comprises: adjusting an internal volume of a pre-chamber igniter by adjusting a position of a cap of the pre-chamber igniter based on operating conditions, the cap including a plurality of orifices fluidically coupling the pre-chamber igniter to a main combustion chamber of a cylinder of an engine. In a first example of the method, adjusting the internal volume of the pre-chamber igniter by adjusting the position of the cap of the pre-chamber igniter based on the operating conditions comprises: increasing the internal volume of the pre-chamber igniter by adjusting the position of the cap to an extended position responsive to at least one of a load of the engine decreasing below a threshold load and a temperature of the engine decreasing below a threshold temperature, and decreasing the internal volume of the pre-chamber igniter by adjusting the position of the cap to a retracted position responsive to at least one of the load of the engine increasing above the threshold load and the temperature of the engine increasing above the threshold temperature. In a second example of the method, optionally including the first example, adjusting the position of the cap of the pre-chamber igniter comprises linearly adjusting the position of the cap in a direction parallel to a central axis of the pre-chamber igniter. In a third example of the method, optionally including one or both of the first and second examples, a bottom outer surface of the cap is closer to a piston of the cylinder in the extended position relative to the retracted position, and wherein a bottom inner surface of the cap is closer to an electrode of the pre-chamber igniter in the retracted position relative to the extended position. In a fourth example of the method, optionally including any or all of the first through third examples, a ground electrode is directly coupled to the bottom inner surface of the cap, and the method further comprises operating the electrode with a higher ignition energy when the cap is positioned in the extended position relative to the retracted position.

In still another example, a system comprises: an engine including a plurality of cylinders, each cylinder including a variable volume pre-chamber igniter, the variable volume pre-chamber igniter including an electrode and a cap that encloses an internal volume of the variable volume pre-chamber igniter; and a controller storing instructions in non-transitory memory that, when executed, cause the controller to: adjust the cap to an extended position responsive to at least one of a load of the engine being below a threshold load and a temperature of the engine being below a threshold temperature; and adjust the cap to a retracted position responsive to at least one of the load of the engine being greater than or equal to the threshold load and the temperature of the engine being greater than or equal to the threshold temperature. In a first example of the system, the cap comprises a substantially cylindrical capped tube having a plurality of openings fluidically coupling the internal volume of the variable volume pre-chamber igniter to an internal volume of the corresponding cylinder, the substantially cylindrical capped tube sharing a central axis with the electrode of the variable volume pre-chamber igniter, and wherein the internal volume of the variable volume pre-chamber igniter is larger when the cap is in the extended position relative to the retracted position. In a second example of the system, optionally including the first example, the variable volume pre-chamber igniter further comprises a ground electrode coupled to an inner surface of the cap, the ground electrode aligned with the electrode along the central axis and separated from the electrode by a spark gap, and wherein the controller includes further instructions stored in non-transitory memory, that, when executed, cause the controller to: actuate the electrode with a higher ignition energy and/or for a longer spark duration when the cap is in the extended position relative to the retracted position. In a third example of the system, optionally including one or both of the first and second examples, a length of the spark gap is larger when the cap is in the extended position relative to the retracted position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a pre-chamber igniter coupled to a cylinder of an engine, the pre-chamber igniter comprising a cap dividing an internal volume of the pre-chamber igniter from an internal volume of the cylinder, the cap movable between a first position and a second position, the cap including a plurality of orifices fluidically coupling the pre-chamber igniter to the internal volume of the cylinder.

2. The system of claim 1, wherein the internal volume of the pre-chamber igniter is smaller when the cap is in the first position and larger when the cap is in the second position.

3. The system of claim 1, wherein the cap extends further toward a piston of the cylinder in the second position relative to the first position, and wherein the cap includes one or more openings that fluidically couple the internal volume of the pre-chamber igniter to the internal volume of the cylinder.

4. The system of claim 1, wherein the pre-chamber igniter includes a spark gap within the internal volume of the pre-chamber igniter between an electrode tip and a ground electrode.

5. The system of claim 4, wherein a bottom inner surface of the cap is closer to the electrode tip in the first position relative to the second position.

6. The system of claim 5, wherein the ground electrode is coupled to the bottom inner surface of the cap, and the spark gap is smaller when the cap is in the first position relative to the second position.

7. The system of claim 4, wherein the ground electrode is coupled to a body of the pre-chamber igniter, the body of the pre-chamber igniter surrounding an upper portion of the cap and fixedly coupled to a cylinder head of the cylinder.

8. The system of claim 7, wherein the ground electrode extends from the body of the pre-chamber igniter into the internal volume of the pre-chamber igniter via a slot in the cap, the slot in the cap sealed from the internal volume of the cylinder via the body of the pre-chamber igniter and sized to enable movement of the cap between the first position and the second position.

9. The system of claim 1, further comprising an actuator for adjusting the cap between the first position and the second position.

10. The system of claim 9, wherein the actuator is one of a solenoid, an electric motor, a pneumatic actuator, a vacuum actuator, and a hydraulic actuator and is directly coupled to the cap.

11. The system of claim 9, wherein the actuator is one of a solenoid, an electric motor, a pneumatic actuator, a vacuum actuator, and a hydraulic actuator and is indirectly coupled to the cap via at least one of a mechanical linkage and a cam.

12. A method, comprising:
adjusting an internal volume of a pre-chamber igniter by adjusting a position of a cap of the pre-chamber igniter based on operating conditions, the cap including a plurality of orifices fluidically coupling the pre-chamber igniter to a main combustion chamber of a cylinder of an engine.

13. The method of claim 12, wherein adjusting the internal volume of the pre-chamber igniter by adjusting the position of the cap of the pre-chamber igniter based on the operating conditions comprises:
increasing the internal volume of the pre-chamber igniter by adjusting the position of the cap to an extended position responsive to at least one of a load of the engine decreasing below a threshold load and a temperature of the engine decreasing below a threshold temperature; and
decreasing the internal volume of the pre-chamber igniter by adjusting the position of the cap to a retracted position responsive to at least one of the load of the engine increasing above the threshold load and the temperature of the engine increasing above the threshold temperature.

14. The method of claim 13, wherein adjusting the position of the cap of the pre-chamber igniter comprises linearly adjusting the position of the cap in a direction parallel to a central axis of the pre-chamber igniter.

15. The method of claim 13, wherein a bottom outer surface of the cap is closer to a piston of the cylinder in the extended position relative to the retracted position, and wherein a bottom inner surface of the cap is closer to an electrode of the pre-chamber igniter in the retracted position relative to the extended position.

16. The method of claim 15, wherein a ground electrode is directly coupled to the bottom inner surface of the cap, and the method further comprises operating the electrode with a higher ignition energy when the cap is positioned in the extended position relative to the retracted position.

17. A system, comprising:
an engine including a plurality of cylinders, each cylinder including a variable volume pre-chamber igniter, the variable volume pre-chamber igniter including an electrode and a cap that encloses an internal volume of the variable volume pre-chamber igniter; and
a controller storing instructions in non-transitory memory that, when executed, cause the controller to:
adjust the cap to an extended position responsive to at least one of a load of the engine being below a threshold load and a temperature of the engine being below a threshold temperature; and
adjust the cap to a retracted position responsive to at least one of the load of the engine being greater than or equal to the threshold load and the temperature of the engine being greater than or equal to the threshold temperature.

18. The system of claim 17, wherein the cap comprises a substantially cylindrical capped tube having a plurality of openings fluidically coupling the internal volume of the variable volume pre-chamber igniter to an internal volume of the corresponding cylinder, the substantially cylindrical capped tube sharing a central axis with the electrode of the variable volume pre-chamber igniter, and wherein the internal volume of the variable volume pre-chamber igniter is larger when the cap is in the extended position relative to the retracted position.

19. The system of claim 18, wherein the variable volume pre-chamber igniter further comprises a ground electrode coupled to an inner surface of the cap, the ground electrode aligned with the electrode along the central axis and separated from the electrode by a spark gap, and wherein the controller includes further instructions stored in non-transitory memory, that, when executed, cause the controller to:
actuate the electrode with a higher ignition energy and/or for a longer spark duration when the cap is in the extended position relative to the retracted position.

20. The system of claim 19, wherein a length of the spark gap is larger when the cap is in the extended position relative to the retracted position.

* * * * *